(12) United States Patent
Washiyama (10) Patent No.: US 8,567,728 B2
(45) Date of Patent: Oct. 29, 2013

(54) IN-VEHICLE DEVICE MOUNTING STRUCTURE

(75) Inventor: Yosuke Washiyama, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 13 days.

(21) Appl. No.: 13/296,744

(22) Filed: Nov. 15, 2011

(65) Prior Publication Data

US 2012/0160974 A1    Jun. 28, 2012

(30) Foreign Application Priority Data

Dec. 28, 2010   (JP) ................. 2010-293107

(51) Int. Cl.
*G12B 9/00* (2006.01)
(52) U.S. Cl.
USPC ....... 248/27.3; 248/27.1; 248/200; 248/309.1
(58) Field of Classification Search
USPC ............................ 248/27.1, 27.3, 200, 309.1; 361/679.01–679.6; 29/525.01, 428
See application file for complete search history.

(56) References Cited

U.S. PATENT DOCUMENTS

| | | | | |
|---|---|---|---|---|
| 4,462,564 A | * | 7/1984 | Alves et al. | 248/27.1 |
| 4,577,818 A | * | 3/1986 | Clarisse | 248/27.3 |
| 4,738,420 A | * | 4/1988 | Angle et al. | 248/27.1 |
| 4,895,326 A | * | 1/1990 | Nimpoeno et al. | 248/27.1 |
| 4,913,384 A | * | 4/1990 | Inamura | 248/27.3 |
| 5,826,836 A | * | 10/1998 | Gallichan et al. | 248/27.3 |
| 6,158,699 A | * | 12/2000 | Boe | 248/27.1 |
| 6,320,120 B1 | * | 11/2001 | Van Haaster | 174/369 |
| 6,651,936 B2 | * | 11/2003 | Upson et al. | 248/27.3 |
| 2002/0066832 A1 | * | 6/2002 | Kwon | 248/27.3 |
| 2007/0223137 A1 | | 9/2007 | Boggess et al. | |

FOREIGN PATENT DOCUMENTS

JP     2007-261571     10/2007

* cited by examiner

*Primary Examiner* — Terrell McKinnon
*Assistant Examiner* — Michael McDuffie
(74) *Attorney, Agent, or Firm* — Brinks Hofer Gilson & Lione (57) ABSTRACT

An in-vehicle device mounting structure includes a plurality of brackets through which the in-vehicle device is mounted to an installation member of a vehicle. Each bracket includes a device mounting portion to be fixed to a surface of the in-vehicle device, a vehicle attachment portion to be fixed to the installation member under the in-vehicle device, a drawn bent portion that is curved to smoothly connect the device mounting portion to the vehicle attachment portion, and a plurality of slits that extend across the drawn bent portion such that the device mounting portion is notched and the slits are arranged in parallel substantially in the front and rear directions of the bracket.

16 Claims, 4 Drawing Sheets

IN-VEHICLE DEVICE MOUNTING STRUCTURE

RELATED APPLICATION

The present application claims priority to Japanese Patent Application Number 2010-293107, filed Dec. 28, 2010, the entirety of which is hereby incorporated by reference.

BACKGROUND OF THE INVENTION

1. Field of the Invention

The present invention relates to a mounting structure for an in-vehicle device, such as a car audio system or a car navigation system, mounted in a vehicle using a bracket, and in particular, relates to improvement of the bracket.

2. Description of the Related Art

Since such an in-vehicle device is often installed on an instrument panel or the like in a vehicle, for example. The head of an occupant may collide with the in-vehicle device upon sudden braking. Furthermore, while moving, a vehicle is susceptible to vibrations in left and right directions and up and down directions depending on a road surface. If the vehicle is moving over a bumpy road, the interior of the vehicle will be shaken violently. To mount an in-vehicle device to an installation member of the vehicle with a bracket, therefore, the bracket should have necessary stiffness so that the mounting position of the device is not shifted due to, for example, vibration caused while the vehicle is moving. In addition, consideration should be given to safety so that if the body of an occupant collides with the in-vehicle device, damage to the occupant can be reduced.

To meet such demands, an in-vehicle device mounting structure has been proposed as disclosed in, for example, U.S. Patent Application Publication No. 2007/0223137 A1. In this mounting structure, a guide member (vibration damping element) having a slot that extends in front and rear directions is secured to an installation member of a vehicle and a fastener is secured to an in-vehicle device. This fastener is usually retained such that the fastener engages the slot at a predetermined position. If a strong impact is applied to the in-vehicle device from the front side (occupant side), the fastener can translate backward along the slot. In this related art, since the fastener is usually retained at the predetermined position within the slot of the guide member, the mounting position of the in-vehicle device is not shifted even when vibrations in the left and right directions and/or the up and down directions are applied to the in-vehicle device while the vehicle is moving. Furthermore, if the body of an occupant collides with the in-vehicle device upon sudden braking, the impact of collision causes the fastener to slide backward within the slot against a retaining force, so that the in-vehicle device moves backward simultaneously with the sliding. Accordingly, an excessive reaction force does not act on the occupant, such that damage to the occupant can be reduced.

In the above-described related art, however, it is difficult to avoid variations of the retaining force for holding the fastener at the predetermined position within the slot of the guide member. Disadvantageously, therefore, an occupant may not be sufficiently protected against a strong impact. Alternatively, the mounting position may be shifted even if the occupant accidentally pushes the in-vehicle device at a pressure of an ordinary level which may be applied in everyday life. Specifically, if the occupant collides with the in-vehicle device and the fastener cannot translate along the slot because the retaining force applied to the fastener in the guide member is too strong, a strong reaction force applied from the in-vehicle device, which is inhibited from moving backward, will act on the occupant. This is undesirable in terms of safety. On the other hand, if the retaining force applied to the fastener in the guide member is too weak, the mounting position of the in-vehicle device may be shifted even when a person or object slightly contacts the device. This is unfavorable in terms of performance retention.

Furthermore, in the above-described related art, in the case where an occupant collides with the in-vehicle device and the fastener slides backward within the slot, impact applied from the occupant cannot be effectively absorbed because the fastener merely moves backward against frictional force in the slot. Accordingly, when the occupant collides with the in-vehicle device and the device moves backward only slightly, a strong reaction force may act on the occupant.

SUMMARY OF THE INVENTION

The present invention has been made in consideration of the above-described circumstances in the related art, and it is an object to provide an in-vehicle mounting structure which can sufficiently reduce damage to the body of an occupant if the occupant collides with an in-vehicle device and which prevents the possibility that performance will be degraded due to, for example, shifting of the mounting position of the in-vehicle device caused by vibrations while a vehicle is moving.

According to one embodiment of the present invention, an in-vehicle device mounting structure includes a plurality of brackets to be fixed to an in-vehicle device such that the brackets are arranged on both sides of the in-vehicle device so as to sandwich the device therebetween, the in-vehicle device being mounted through the brackets to an installation member of a vehicle such that the front of the in-vehicle device is exposed to the interior of the vehicle, wherein each of the brackets includes a plate-shaped device mounting portion to be fixed to the in-vehicle device, a plate-shaped vehicle attachment portion substantially orthogonal to the device mounting portion, a drawn bent portion that is curved to smoothly connect the device mounting portion to the vehicle attachment portion, and a plurality of slits that extend across the drawn bent portion such that the device mounting portion is notched, the slits are arranged in parallel in substantially front and rear directions of the bracket, and the vehicle attachment portion is to be fixed to the installation member.

In the in-vehicle mounting structure with this configuration, since each drawn bent portion increases the stiffness of the corresponding bracket having the slits, there is little possibility that the brackets will be deformed if vibrations in left and right directions and/or up and down directions are applied to the mounting structure in which the device mounting portions of the brackets are fixed to the in-vehicle device and the vehicle attachment portions thereof are fixed to the installation member of the vehicle. Advantageously, there is no risk that the mounting position of the in-vehicle device will be shifted by vibrations caused while the vehicle is moving.

If the body of an occupant strongly collides with the in-vehicle device, the brackets having the slits arranged in substantially the front and rear directions will be relatively easily deformed. Advantageously, impact applied from the front side of the in-vehicle device can be effectively absorbed by deformation of the brackets. However, the brackets having necessary stiffness will not be deformed if an impact applied from the front side is not very strong. Accordingly, there is no risk that the brackets will be deformed when an occupant carelessly applies a pressure of an ordinary level which may be applied in everyday life to the in-vehicle device.

Specifically, the total stiffness of each of the brackets is increased such that the device mounting portion is smoothly connected to the vehicle attachment portion through the drawn bent portion with geometric stiffness increased by drawing and bending in consideration of the fact that the slits, arranged in order to absorb impact applied from the front side, reduce the total stiffness of the bracket. Advantageously, the brackets can exhibit good impact absorbability that is useful when an occupant strongly collides with the in-vehicle device while providing stiffness necessary for stably holding the in-vehicle device at a mounting position.

In this structure, each of the brackets may include an inclined portion that extends obliquely from the vehicle attachment portion to the front edge of the device mounting portion and is continuous with the drawn bent portion. Advantageously, since the inclined portion functions as a beam or brace of the bracket, the stiffness of the bracket against vibrations in the left and right directions and the up and down directions can be further increased.

In this case, the front edge of the drawn bent portion may be positioned behind the front edge of the device mounting portion. When an impact applied from the front side of the in-vehicle device causes the device mounting portion to be strongly pushed backward, stress tends to be concentrated at the part corresponding to the boundary between the inclined portion and the vehicle attachment portion. Advantageously, the boundary part is immediately deformed, thus facilitating deformation of the bracket. Accordingly, impact applied from the front side can be reliably absorbed by the deformation of the brackets.

In this structure, each of the brackets may include a narrow part disposed in a rear end portion of the device mounting portion such that the depth dimension is locally reduced next to the backmost slit of the slits. In this case, when an impact applied from the front side of the in-vehicle device causes the device mounting portion to be strongly pushed backward, stress tends to be concentrated at the narrow part. Accordingly, the narrow part is immediately deformed, thus facilitating deformation of the bracket. Advantageously, a strong impact applied from the front side can be reliably absorbed by deformation of the brackets.

In this structure, the slits may extend along planes substantially orthogonal to the device mounting portion and the vehicle attachment portion in each bracket. It is preferable because portions surrounding the slits do not tend to be deformed by external forces in the left and right directions and the up and down directions but tend to be deformed by external forces in the front and rear directions.

In this structure, the device mounting portions of one pair of the brackets arranged on the left and right sides of the in-vehicle device so as to sandwich the device therebetween may be fixed to side surfaces of the in-vehicle device, and the vehicle attachment portions thereof may be fixed to the installation member under the in-vehicle device. Advantageously, the in-vehicle device can be easily and compactly mounted in a stable posture at a predetermined position through this one pair of brackets.

In this case, the vehicle attachment portions of the one pair of the brackets may extend toward each other under the in-vehicle device. Advantageously, since this pair of brackets can be arranged so as to hold the in-vehicle device, a mounting space for the in-vehicle device with the brackets can be preferably reduced.

In this structure, each of the brackets may be made of metal with a plate-like configuration. This is preferable because brackets which are easy to work and have high mechanical strength and high durability can be provided at low cost.

In this in-vehicle mounting structure, there is little possibility that the brackets each having stiffness increased by the drawn bent portion will be deformed if vibrations in the left and right directions and/or the up and down directions are applied to the mounting structure in which the device mounting portions of the brackets are fixed to the in-vehicle device and the vehicle attachment portions thereof are fixed to the installation member of the vehicle. Advantageously, there is no risk that the mounting position of the in-vehicle device will be shifted by vibrations caused while the vehicle is moving. Moreover, if the body of an occupant strongly collides with the in-vehicle device, the brackets having the slits arranged in substantially the front and rear directions will be relatively easily deformed. Advantageously, an impact applied from the front side can be effectively absorbed by deformation of the brackets. The brackets having necessary stiffness will not be deformed if an impact applied from the front side is not very strong. Accordingly, there is no risk that the brackets will be deformed when a pressure of an ordinary level which may be applied in everyday life acts on the in-vehicle device. Accordingly, the in-vehicle device mounting structure including the brackets can reduce damage to the body of an occupant upon a strong collision with the in-vehicle device to provide high safety and can stably hold the in-vehicle device at a mounting position to prevent the possibility that performance will be degraded due to, for example, shifting of the mounting position of the in-vehicle device caused by vibrations while the vehicle is moving. The mounting structure therefore has such advantages.

DESCRIPTION OF THE PREFERRED EMBODIMENTS

Figure 1:
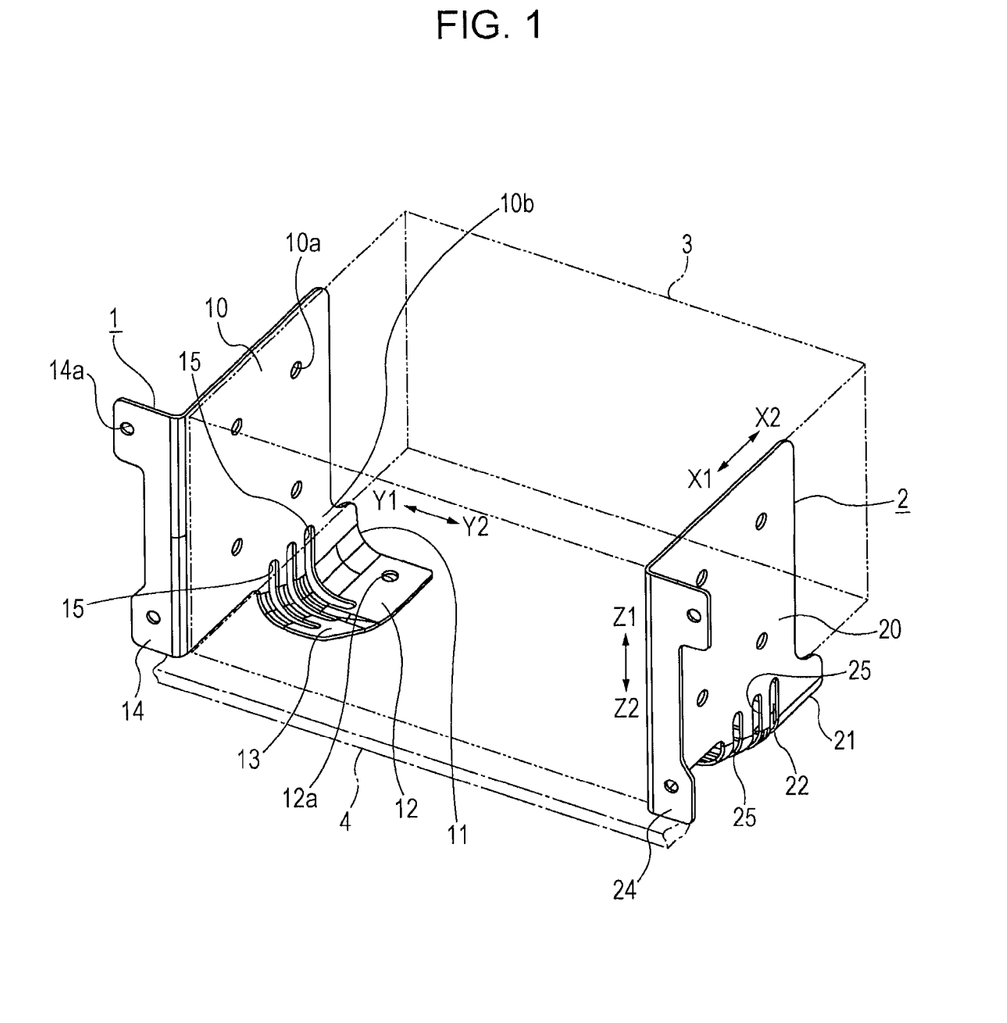
FIG. 1 is a diagram illustrating an in-vehicle device mounting structure according to an embodiment of the present invention.
Figure 2:
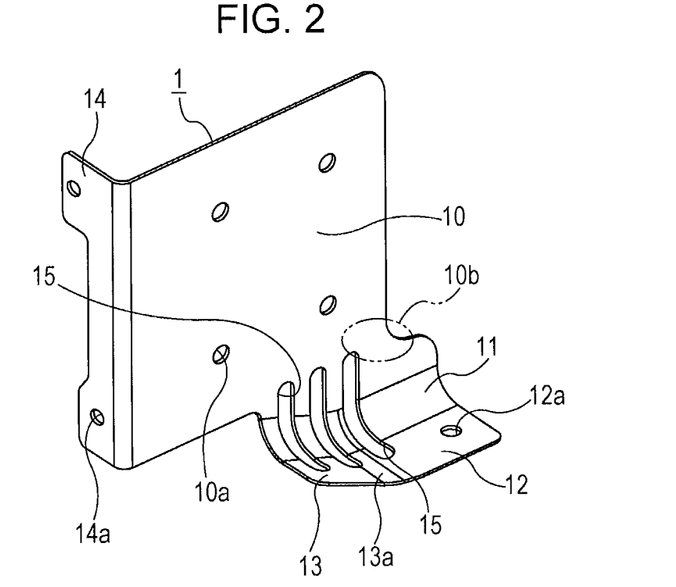
FIG. 2 is a perspective view of a bracket included in the mounting structure of FIG. 1.
Figure 3:
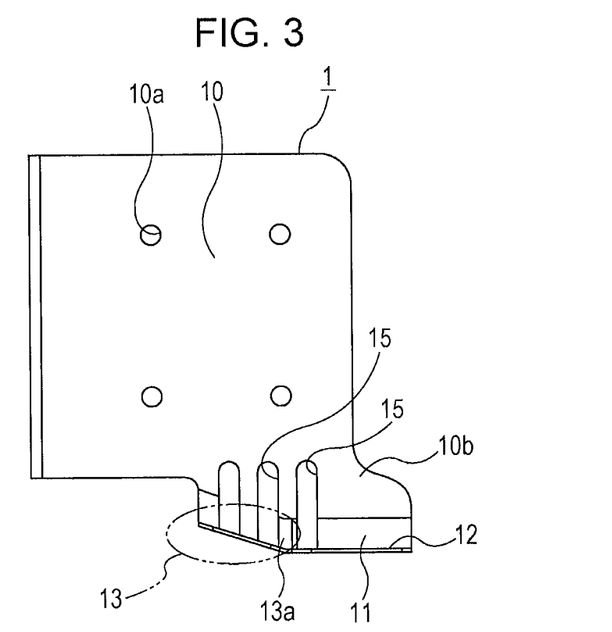
FIG. 3 is a side elevational view of the bracket.
Figure 4:
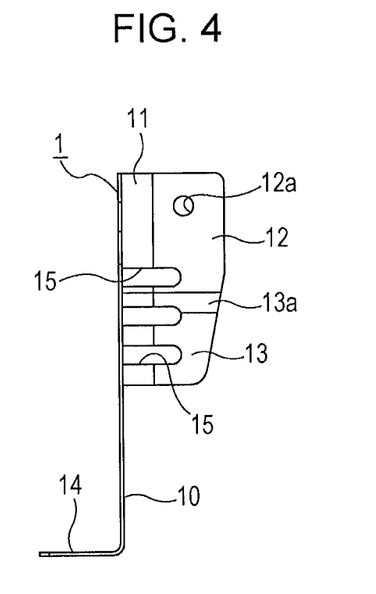
FIG. 4 is a top view of the bracket.
Figure 5:
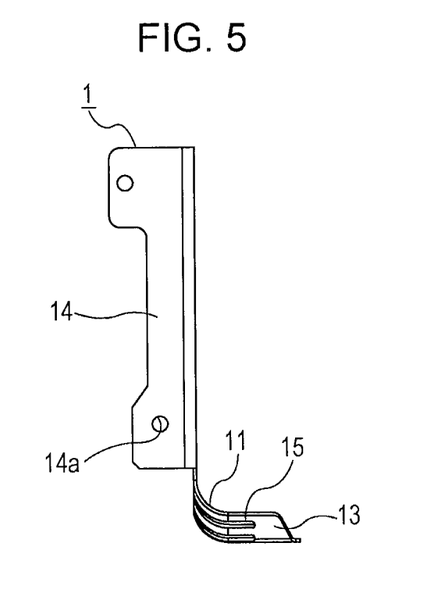
FIG. 5 is a front view of the bracket.

An embodiment of the present invention will be described below with reference to the drawings. Referring to FIG. 1, an in-vehicle device mounting structure according to the present embodiment includes a pair of brackets 1 and 2, each made of metal with a plate-shape configuration, such that the brackets are positioned on the left and right sides of an in-vehicle device 3 so as to sandwich the device therebetween. The brackets 1 and 2 are configured such that device mounting portions 10 and 20 are to be fixed to side surfaces of the in-vehicle device 3, and vehicle attachment portions 12 and 22 are to be fixed to an installation member 4 (indicated by an alternate long and short dashed line in FIG. 1) of a vehicle under the in-vehicle device 3.

The shapes of the brackets 1 and 2 are symmetric in the left and right directions (Y1-Y2 directions in FIG. 1), but the brackets have the same size and the same basic structure. Accordingly, FIGS. 2 to 6 each illustrate only the left bracket 1. In the following description, the bracket 1 will be mainly described in detail.

The in-vehicle device 3 is an electronic device, such as a car audio system or a car navigation system. The in-vehicle device 3 includes a rectangular-parallelepiped outer chassis (housing). In FIG. 1, the outer shape of this outer chassis is indicated by a chain double-dashed line.

The bracket 1 includes the device mounting portion 10 that is plate-shaped and is substantially vertically oriented and is to be fixed to the side surface of the in-vehicle device 3, a drawn bent portion 11 that is disposed continuously with the lower part of the device mounting portion 10, the vehicle attachment portion 12 that is plate-shaped and is substantially horizontally oriented and is connected through the drawn bent portion 11 to the lower part of the device mounting portion 10, an inclined portion 13 that extends forward and obliquely upward from the vehicle attachment portion 12 to the front edge of the device mounting portion 10 so as to be continuous with the drawn bent portion 11, a flange 14 bent so as to extend laterally from the front edge of the device mounting portion 10, and three slits 15 that extend across the drawn bent portion 11. The other bracket 2 similarly includes the device mounting portion 20, a drawn bent portion 21, the vehicle attachment portion 22, an inclined portion (not illustrated), a flange 24, and three slits 25.

The device mounting portion 10 of the bracket 1 has four mounting holes 10a. The device mounting portion 10 is fixed to the left side surface of the in-vehicle device 3 with fixing screws (not illustrated) inserted through the mounting holes 10a. Although the device mounting portion 10 is generally rectangular, the back lower part of the device mounting portion 10 extends downward and backward. The extending part is partly notched vertically to provide the slits 15. In addition, the device mounting portion 10 includes a narrow part 10b positioned behind an upper end portion of the backmost slit of the slits 15. The narrow part 10b is a region in which the depth dimension is locally reduced next to the backmost slit 15. The device mounting portion 20 of the other bracket 2 is fixed to the right side surface of the in-vehicle device 3. The device mounting portions 10 and 20 of the pair of brackets 1 and 2 are arranged so as to face each other (refer to FIG. 1).

The drawn bent portion 11 of the bracket 1 is curved so as to smoothly connect the lower part of the device mounting portion 10, the vehicle attachment portion 12, and the inclined portion 13. The front edge of the drawn bent portion 11 is positioned behind the front edge of the device mounting portion 10.

The vehicle attachment portion 12 of the bracket 1 has an attachment hole 12a. The vehicle attachment portion 12 is fixed to the installation member 4 with a fixing screw (not illustrated) inserted through the attachment hole 12a. The vehicle attachment portion 12 corresponds to a base of the bracket 1. When the device mounting portion 10 is fixed to the left side surface of the in-vehicle device 3, the vehicle attachment portion 12 is disposed under the in-vehicle device 3. Furthermore, when the device mounting portion 20 of the other bracket 2 is fixed to the right side surface of the in-vehicle device 3, the vehicle attachment portion 22 is also disposed under the in-vehicle device 3, so that the vehicle attachment portions 12 and 22 of the pair of brackets 1 and 2 are arranged so as to extend toward each other (refer to FIG. 1).

The inclined portion 13 of the bracket 1 extends forward and obliquely upward from a boundary part 13a with the vehicle attachment portion 12 (see FIGS. 2 to 5). The inclined portion 13 is connected through the front part of the drawn bent portion 11 to the lower part of the device mounting portion 10.

The slits 15 of the bracket 1 are arranged across the drawn bent portion 11 such that the slits extend along planes (Y and Z planes in FIG. 1) substantially orthogonal to the vehicle attachment portion 12 and the device mounting portion 10. In addition, the upper ends of the slits 15 reach the lower part of the device mounting portion 10 such that the lower part is notched, and the lower ends of the slits 15 reach the vehicle attachment portion 12 and the inclined portion 13 such that those portions are notched. The slits 15 are arranged in parallel at substantially regular intervals in the front and rear directions (X1-X2 directions in FIG. 1).

The flange 14 of the bracket 1 extends laterally from the front edge of the device mounting portion 10 in the direction opposite to the vehicle attachment portion 12. The flange 14 has two attachment holes 14a arranged in its upper and lower portions, respectively, such that the flange 14 is fixed to a panel or the like (not illustrated) with fixing screws (not illustrated) inserted through the attachment holes 14a.

As described above, since the brackets 1 and 2 have the same structure except that the shapes thereof are symmetric in the left and right directions (the Y1-Y2 directions in FIG. 1), the detailed description of the other bracket 2 is omitted.

In the mounting structure according to the present embodiment, the device mounting portions 10 and 20 of the brackets 1 and 2 are fixed to the left and right side surfaces of the in-vehicle device 3, the vehicle attachment portions 12 and 22 of the brackets 1 and 2 are fixed to the installation member 4 under the in-vehicle device 3, and the flanges 14 and 24 of the brackets 1 and 2 are fixed to the panel or the like (not illustrated). Advantageously, the in-vehicle device 3 can be compactly mounted in a stable posture at a predetermined position in the vehicle through the pair of brackets 1 and 2. Specifically, the brackets 1 and 2 including the drawn bent portions 11 and 21 have such stiffness that the brackets will not tend to be deformed if vibrations in the left and right directions (Y1-Y2 directions) and/or the up and down directions (Z1-Z2 directions) are applied to the brackets. Accordingly, the possibility of deformation of the brackets 1 and 2 upon application of vibrations in the left and right directions and/or the up and down directions to the in-vehicle device 3 is very low. Advantageously, the mounting position of the in-vehicle device 3 may not be shifted due to vibrations caused while the vehicle is moving.

Regarding modifications of the brackets 1 and 2, the vehicle attachment portions 12 and 22 may extend from the device mounting portions 10 and 20 in opposite directions. In this case, when the brackets 1 and 2 are fixed to the left and right side surfaces of the in-vehicle device 3, the vehicle attachment portions 12 and 22 extend away from each other, such that the vehicle attachment portions 12 and 22 are fixed to the installation member 4 on both sides of the in-vehicle device 3 so as not to overlap with the lower surface of the in-vehicle device 3. In this case, therefore, the in-vehicle device 3 can also be mounted in a stable posture at a predetermined position in the vehicle but the space factor is slightly reduced because the dimension in the left and right directions (Y1-Y2 directions) of a mounting space for the in-vehicle device 3 with the brackets 1 and 2 is increased.

Figure 6:
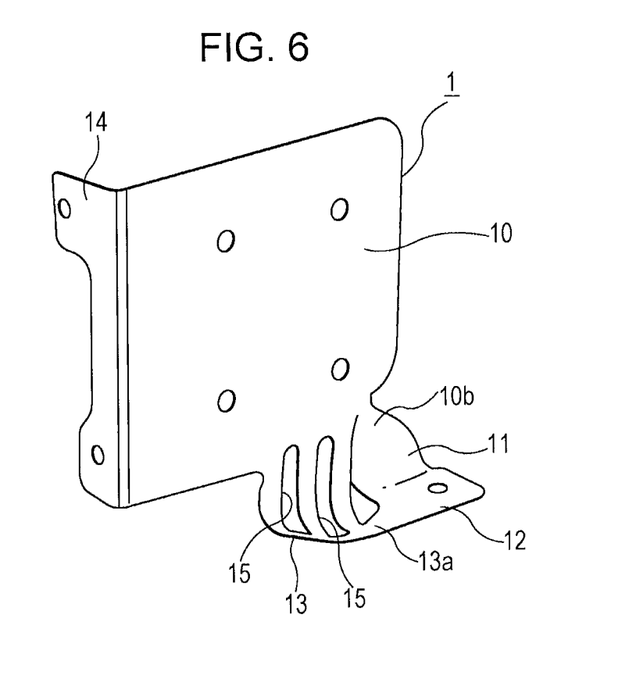
FIG. 6 is a perspective view of the bracket deformed by an impact applied from the front side of the bracket.

Moreover, in the mounting structure according to the present embodiment, when the body of an occupant strongly collides with the in-vehicle device 3, the brackets 1 and 2 respectively having the slits 15 and 25 arranged in the front and rear directions (X1-X2 directions) are relatively easily deformed, so that an impact applied from the front side of the in-vehicle device 3 can be effectively absorbed. In other words, when a strong impact is applied from the front side to the in-vehicle device 3, the device mounting portions 10 and 20 of the brackets 1 and 2 are strongly pushed backward. Accordingly, for example, the bracket 1 is relatively easily deformed as illustrated in FIG. 6 because stress is concentrated to the boundary part 13a of the inclined portion 13 and the narrow part 10b of the device mounting portion 10. Although not illustrated, the other bracket 2 is relatively easily deformed for the same reason.

More specifically, in the bracket 1, the front edge of the drawn bent portion 11 continuous with the inclined portion 13 is positioned behind the front edge of the device mounting portion 10. When impact applied from the front side to the in-vehicle device 3 causes the device mounting portion 10 to be strongly pushed backward, therefore, stress tends to be concentrated at the boundary (boundary part 13a) between the inclined portion 13 and the vehicle attachment portion 12. Thus, the boundary part 13a is immediately deformed. Furthermore, the narrow part 10b of the device mounting portion 10 is next to the backmost slit 15 such that the depth dimension is locally reduced. When a strong impact applied from the front side to the in-vehicle device 3 causes the device mounting portion 10 to be strongly pushed backward, therefore, stress tends to be concentrated at the narrow part 10b. Thus, the narrow part 10b is immediately deformed. The same also applies to the other bracket 2. Accordingly, a strong impact applied from the front side of the in-vehicle device 3 can be reliably absorbed by deformation of the brackets 1 and 2.

The brackets 1 and 2 having necessary stiffness will not be deformed if an impact applied from the front side of the in-vehicle device 3 is not very strong. Accordingly, the brackets 1 and 2 may not be deformed, for example, even when an occupant accidentally pushes the in-vehicle device 3 at a pressure of an ordinary level which may be applied in everyday life.

In other words, the total stiffnesses of the pair of left and right brackets 1 and 2 are increased such that the device mounting portions 10 and 22 are smoothly connected to the vehicle attachment portions 12 and 22 through the drawn bent portions 11 and 21 with geometric stiffnesses increased by drawing and bending in consideration of the fact that the slits 15 and 25, arranged in order to absorb impact applied from the front side, reduce the total stiffnesses of the brackets 1 and 2. Advantageously, the brackets 1 and 2 can exhibit good impact absorbability that is useful when an occupant strongly collides with the in-vehicle device 3 while providing stiffness necessary for stably holding the in-vehicle device 3 at a predetermined mounting position.

Furthermore, in the mounting structure according to the present embodiment, the brackets 1 and 2 each include the inclined portion 13 (though the inclined portion of the bracket 2 is not illustrated). Since the inclined portions 13 extend forward and obliquely upward from the vehicle attachment portions 12 and 22 toward the front edges of the device mounting portions 10 and 20 such that the inclined portions are continuous with the drawn bent portions 11 and 21, the inclined portions 13 function as beams or braces of the brackets 1 and 2. Advantageously, the inclined portions 13 further increase the stiffnesses of the brackets 1 and 2 against vibrations in the left and right directions and the up and down directions.

Moreover, in the mounting structure according to the present embodiment, since the slits 15 and 25 of the brackets 1 and 2 extend along the planes (Y and Z planes in FIG. 1) substantially perpendicular to the vehicle attachment portions 12 and 22 and the device mounting portions 10 and 20, respectively, portions surrounding the slits 15 and 25 do not tend to be deformed by external forces in the right and left directions and the up and down directions but tend to be deformed by external forces in the front and rear directions. Accordingly, the impact absorbability for protecting an occupant against strong collision with the in-vehicle device 3 is naturally increased while stiffness necessary to prevent the mounting position of the in-vehicle device 3 from being shifted due to vibrations caused while the vehicle is moving is provided. The direction in which the slits 15 and 25 extend may be at a slight angle with respect to the Y and Z planes. Regarding the number of slits, two or four or more slits 15 and two or four or more slits 25 may be provided.

Figure 7:
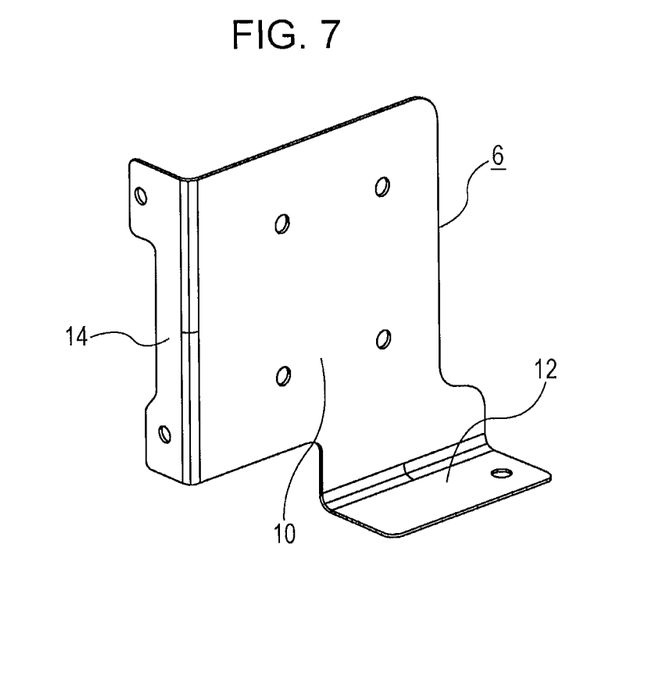
FIG. 7 is a perspective view of a bracket formed as a comparative example.

FIG. 7 illustrates a bracket 6 made as a comparative example. The bracket 6 is made of the same material as that of the bracket 1 according to the present embodiment and has the same dimensions as those of the bracket 1. In the bracket 6 according to the comparative example, the lower end part of the device mounting portion 10 is bent in a simple L-shape and is continuous with the vehicle attachment portion 12. The bracket 6 does not include the drawn bent portion 11, the inclined portion 13, and the slits 15. In the comparative example, a bracket (not illustrated) that is symmetric with the bracket 6 was made so as to correspond to the other bracket 2 according to the present embodiment. As a reference case, a rigid object corresponding to the in-vehicle device 3 was mounted to an installation member through the brackets 1 and 2 in a manner similar to FIG. 1. As a comparative case, the rigid object was mounted to the installation member through the bracket 6 and the other bracket according to the comparative example. A lowest-order natural frequency of each of the reference case and the comparative case upon application of vibrations in the right and left directions and upon application of vibrations in the up and down directions, and a maximum acceleration and an average acceleration of each of the reference case and the comparative case upon application of impact from the front side of the rigid object were measured.

First, as the result of measurement of the lowest-order natural frequencies upon application of vibrations in the right and left directions (Y1-Y2 directions in FIG. 1), 54.9 Hz was measured in the reference case using the brackets 1 and 2 according to the present embodiment and 54.2 Hz was measured in the comparative case using the brackets according to the comparative example. In other words, it was found that although the brackets 1 and 2 according to the present embodiment have the slits 15 and 25, the stiffnesses of them against vibrations in the right and left directions were substantially equal to or slightly higher than those of the brackets according to the comparative example because the brackets 1 and 2 include the drawn bent portions 11 and 21 and the inclined portions 13. Next, as the result of measurement of the lowest-order natural frequencies upon vibrations in the up and down directions (Z1-Z2 directions in FIG. 1), 71.7 Hz was measured in the reference case using the brackets 1 and 2 according to the present embodiment and 70.0 Hz was measured in the comparative case using the brackets according to the comparative example. In other words, it was also found that the stiffnesses of the brackets 1 and 2 according to the present embodiment against vibrations in the up and down directions were substantially equal to or slightly higher than those of the brackets according to the comparative example.

In addition, as the result of measurement of maximum accelerations and average accelerations (well-known 3 ms clip accelerations) using a collision test in which an impact was applied from the front side of the rigid object, a maximum acceleration of 280.3 G and an average acceleration of 13.1 G were measured in the reference case using the brackets 1 and 2 according to the present embodiment, and a maximum acceleration of 348.1 G and an average acceleration of 27.5 G were measured in the comparative case using the brackets according to the comparative example. In other words, it was found that the impact absorbability exhibited by the brackets 1 and 2 according to the present embodiment was markedly increased because the brackets 1 and 2 have the slits 15 and 25 and tend to be deformed at the boundary part 13*a* and corresponding boundary part in bracket 2 and the narrow part 10*b* and corresponding narrow part in bracket 2.

The material of the brackets 1 and 2 can be an appropriate material, although it is preferable that the brackets 1 and 2 be made of metal with a plate-like configuration as in the present embodiment, because such brackets which are easy to work and have high mechanical strength and high durability can be provided at low cost. Furthermore, each of the number of slits 15 and the number of slits 25 is not limited to three. As long as a plurality of slits are arranged to provide necessary stiffness, any number of slits may be provided.

Although the device mounting portions 10 and 20 of the pair of brackets 1 and 2 are fixed to the left and right side surfaces of the in-vehicle device 3, respectively, in the present embodiment, device mounting portions of one pair of brackets may be fixed to the upper surface or lower surface of an in-vehicle device. In this case, vehicle attachment portions of the pair of brackets may be fixed to an installation member on both sides of the in-vehicle device. Furthermore, the in-vehicle device 3 may be fixed to an installation member of a vehicle through a plurality of pairs of brackets such that two or more brackets are arranged on one side of the device.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An in-vehicle device mounting structure comprising:
a plurality of brackets to be fixed to an in-vehicle device such that the brackets are positioned on both sides of the in-vehicle device so as to sandwich the device therebetween, the in-vehicle device being mounted through the brackets to an installation member of a vehicle such that the front of the in-vehicle device is exposed in the interior of the vehicle, wherein
each of the brackets includes:
a plate-shaped device mounting portion oriented along a first plane and adapted to be fixed to the in-vehicle device;
a plate-shaped vehicle attachment portion oriented along a second plane disposed substantially orthogonal to the device mounting portion and adapted to be fixed to the installation member;
a drawn bent portion that is curved between the first plane and the second plane to smoothly connect the device mounting portion to the vehicle attachment portion; and
a plurality of slits that extend across the drawn bent portion such that the device mounting portion is notched, the slits extending substantially from the first plane to the second plane and being arranged in parallel in substantially the front and rear directions of the bracket, wherein the slitted drawn bent portion can deform to absorb an impact applied from the front side of the in-vehicle device fixed to the brackets.

2. The structure according to claim 1, wherein each of the brackets includes an inclined portion that extends obliquely from the vehicle attachment portion toward the front edge of the device mounting portion and is continuous with the drawn bent portion.

3. The structure according to claim 2, wherein the front edge of the drawn bent portion is positioned behind the front edge of the device mounting portion.

4. The structure according to claim 1, wherein each of the brackets includes a narrow part disposed in a rear end portion of the device mounting portion such that the depth dimension is locally reduced near the backmost slit of the slits.

5. The structure according to claim 1, wherein the slits extend along planes substantially orthogonal to the device mounting portion and the vehicle attachment portion in each bracket.

6. The structure according to claim 1, wherein the device mounting portions of one pair of the brackets arranged on the left and right sides of the in-vehicle device so as to sandwich the device therebetween are adapted to be fixed to side surfaces of the in-vehicle device, and the vehicle attachment portions thereof are adapted to be fixed to the installation member under the in-vehicle device.

7. The structure according to claim 6, wherein the vehicle attachment portions of the one pair of brackets extend toward each other under the in-vehicle device.

8. The structure according to claim 1, wherein each of the brackets is made of metal with a plate-like configuration.

9. An in-vehicle device mounting structure comprising:
a plurality of brackets to be fixed to an in-vehicle device, the in-vehicle device being mounted through the brackets to an installation member of a vehicle such that the front of the in-vehicle device is exposed in the interior of the vehicle, wherein
each of the brackets includes:
a plate-shaped device mounting portion oriented along a first plane and adapted to be fixed to the in-vehicle device;
a plate-shaped vehicle attachment portion oriented along a second plane disposed substantially orthogonal to the device mounting portion and adapted to be fixed to the installation member;
a drawn bent portion that is curved between the first plane and the second plane to smoothly connect the device mounting portion to the vehicle attachment portion; and
a plurality of slits that extend across the drawn bent portion, the slits extending substantially from the first plane to the second plane and being arranged in parallel in substantially the front and rear directions of the bracket, wherein the slitted drawn bent portion can deform to absorb an impact applied from the front side of the in-vehicle device fixed to the brackets.

10. The structure according to claim 9, wherein each of the brackets includes an inclined portion that extends obliquely from the vehicle attachment portion toward the front edge of the device mounting portion and is continuous with the drawn bent portion.

11. The structure according to claim 10, wherein the front edge of the drawn bent portion is positioned behind the front edge of the device mounting portion.

12. The structure according to claim 9, wherein each of the brackets includes a narrow part disposed in a rear end portion of the device mounting portion such that the depth dimension is locally reduced near the backmost slit of the slits.

13. The structure according to claim 9, wherein the slits extend along planes substantially orthogonal to the device mounting portion and the vehicle attachment portion in each bracket.

14. The structure according to claim 9, wherein the device mounting portions of one pair of the brackets are adapted to be fixed to side surfaces of the in-vehicle device and the vehicle attachment portions thereof are adapted to be fixed to the installation member under the in-vehicle device.

15. The structure according to claim 14, wherein the vehicle attachment portions of the one pair of brackets extend toward each other under the in-vehicle device.

16. The structure according to claim 9, wherein each of the brackets is made of metal with a plate-like configuration.

* * * * *